United States Patent

Boerger, Jr. et al.

Patent Number: 5,416,966
Date of Patent: May 23, 1995

[54] CONTROL OF SPRING ASSEMBLY PRELOAD OF A FRICTION ELEMENT FOR AN AUTOMATIC TRANSMISSION

[75] Inventors: James G. Boerger, Jr., Northville; James F. Voeffray, Southfield; Denton R. Haight, Livonia, all of Mich.

[73] Assignee: Ford Motor Company, Dearborn, Mich.

[21] Appl. No.: 272,058

[22] Filed: Jul. 8, 1994

[51] Int. Cl.⁶ .............................. B23P 11/00
[52] U.S. Cl. .................... 29/407; 29/446; 192/70.28; 192/87.1
[58] Field of Search ............ 29/407, 446; 192/87.1, 192/87.11, 87.13, 87.14, 87.16, 87.17, 87.18, 88 R, 85 A, 70.27, 70.28

[56] References Cited

U.S. PATENT DOCUMENTS

| | | |
|---|---|---|
| 4,759,234 | 7/1988 | Premiski et al. |
| 4,957,195 | 9/1990 | Kano et al. ............... 192/87.1 X |
| 4,958,753 | 9/1990 | Nogle et al. ............. 192/87.16 X |
| 5,115,558 | 5/1992 | Bernhardt et al. |
| 5,337,871 | 8/1994 | Testerman ............... 192/85 R |

OTHER PUBLICATIONS

U.S. Ser. No. 08/113,010, filed Aug. 30, 1993, "Device for Supporting a Spring Pack Against Compression Instability Displacement", to Dover.

Primary Examiner—S. Thomas Hughes
Attorney, Agent, or Firm—Frank G. McKenzie; Roger L. May

[57] ABSTRACT

A friction element subassembly for an automatic transmission includes a hydraulic cylinder fixed to a hub, the hub providing a snap ring groove, and a balance piston surrounding the hub defining a space within. A return ring assembly, located in a piston, applies a force to the center of a ring through a load cell. The position of one end of a length gauge is set at a predetermined distance from a reference position, the gauge extending through a guide bushing and ring to a snap ring groove. When a predetermined force of a predetermined magnitude is applied to the ring, a preferred thickness of the snap ring is determined from a dimensional change readily accessible from the assembly. A snap ring having substantially the same thickness as the preferred thickness is inserted in the snap ring groove to produce a predetermined compression preload in the spring assembly.

10 Claims, 1 Drawing Sheet

CONTROL OF SPRING ASSEMBLY PRELOAD OF A FRICTION ELEMENT FOR AN AUTOMATIC TRANSMISSION

BACKGROUND OF THE INVENTION

1. Field of the Invention

This invention pertains to the field of automatic transmissions for automotive vehicles. More particularly, the invention pertains to a technique for assembling a friction element with a predetermined preload in a spring subassembly.

2. Description of the Prior Art

It is conventional practice in an automatic transmission to control the operation of a gearset using hydraulically-actuated friction elements, i.e., friction clutches and brakes. A friction element includes an hydraulic cylinder fixed against displacement on a hub, a piston axially displaceable within the cylinder, a balance piston located within the cylinder, and a compression spring pack subassembly contacting the balance piston and piston. A snap ring is used to join the balance piston to the hub.

A spring force applied to the piston assembly forces the piston away from the balance piston and into contact with the hydraulic cylinder. When the friction element is disengaged, pressurized hydraulic fluid is vented from the cylinder and the spring pack forces the piston away from sets of clutch discs whose mutual, frictional engagement produces a driving connection between the elements of the clutch or brake. To engage the friction element, pressurized hydraulic fluid is supplied to the hydraulic cylinder between the piston and cylinder, thereby producing a pressure force on the end of the piston, which acts to compress the spring and to force the sets of clutch discs into mutual frictional engagement.

It is important in the operation of the friction element that the hydraulic piston quickly take up clearances in the clutch or brake and bring the friction discs into mutual contact. To accomplish this, high pressure hydraulic fluid is applied to the clutch cylinder for a brief period, after which hydraulic pressure magnitude is decreased abruptly and then increases at a linear rate over time. These details are directed to accomplish the gear ratio change quickly and smoothly without harshness or excessive wear, and preferably without the vehicle operator being able to perceive the gear ratio change.

When the compression preload in the spring assembly is low, clearances in the friction element are taken up quickly and the gear ratio change is completed sooner than if the spring pack preload were higher than needed to return the hydraulic piston into contact with the hydraulic cylinder.

Automatic transmission shift quality is dependent upon the consistency of spring pack preload. Variation in the spring pack free length and clutch housing dimensional consistency results in a large variation in the magnitude of the spring pack preload.

SUMMARY OF THE INVENTION

Use of the present invention provides a significant improvement in the quality of the gear ratio changes of an automatic transmission. Use of the present invention greatly reduces variation in magnitude of the spring pack preload in a friction element of an automatic transmission.

The invention is applicable to both friction clutches and friction brakes, and can be used when the spring pack assembly includes multiple coiled springs, Belleville springs, and other spring forms, preferably compression springs.

To accomplish this result, the present invention permits precise control of the spring pack assembly by controlling the magnitude of the compression preload in the spring assembly by using an innovative assembly technique. The method of assembly measures precisely the magnitude of the spring preload, determines automatically a preferred thickness of the snap ring that will maintain that preload, and permits rapid selection and installation of a snap ring having that preferred thickness.

The technique for accomplishing the objects of the present invention includes forming a friction element subassembly surrounding a hub provided with a snap ring groove without inserting the snap ring in the snap ring groove. An hydraulic cylinder is fixed against displacement on the hub. Next, a piston, balance piston, and spring pack, are installed within the cylinder and surrounding the hub, such that the piston and balance piston are spaced mutually along the hub, the piston contacts the cylinder, the spring pack is located between the piston and balance piston, and the balance piston is located near the groove. The spring pack is displaced by applying a force of predetermined magnitude to the balance piston, and the displacement of the spring pack due to the force is determined. Then the force is removed, and a snap ring having a thickness substantially equal to said displacement is installed in the groove adjacent the balance piston such that the snap ring maintains a load in the springs.

BRIEF DESCRIPTION OF THE DRAWINGS

The FIGURE is a cross section through a subassembly of a friction element and a device for preloading a piston return spring pack.

DESCRIPTION OF THE PREFERRED EMBODIMENT

Figure 1:
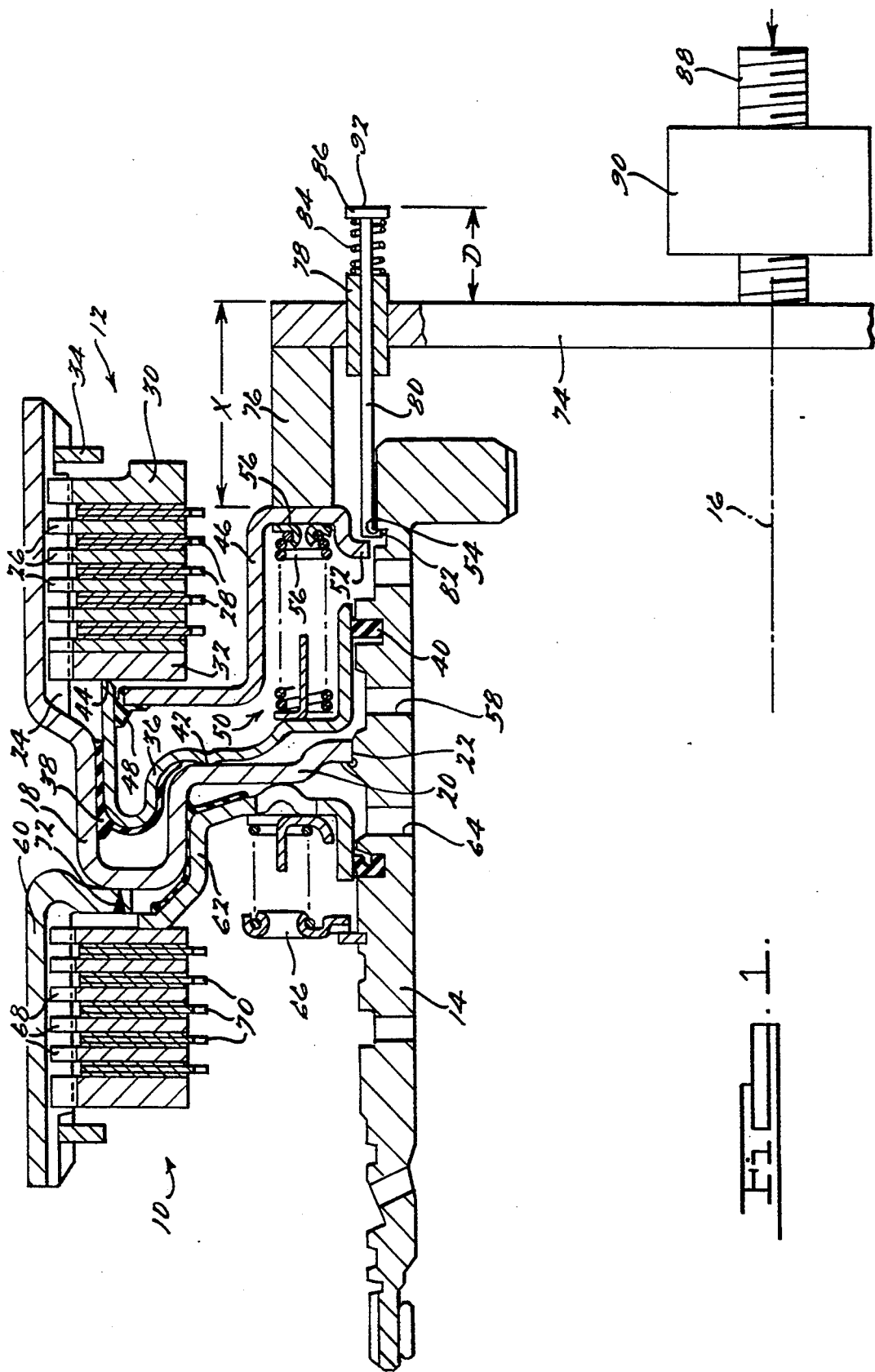

The subassembly of friction elements for an automatic transmission includes a direct clutch 10 and intermediate clutch 12, arranged concentrically about a clutch hub 14. The clutches 10, 12 and hub 14 are concentric about a central axis 16 running substantially parallel to the length of hub 14.

Intermediate clutch 12 includes an hydraulic cylinder 18 having a radially directed web 20 fixed at 22 to the surface of hub 14. The nature of the connection at 22 is such that the axial and radial position of the cylinder 18 is fixed with respect to the hub. Cylinder 18 is formed with internal splines 24, which extend axially and are distributed angularly about axis 16. A first set of clutch discs 26 is fixed torsionally to cylinder 18 by engaging the splines 24 with a set of external splines formed on the radially outer ends of discs 26. A second set of clutch discs 28 is formed with radially inner splines by means of which it is connected to another element of the automatic transmission when clutch 12 is engaged. Located at each axial end of the clutch disc sets 26, 28 are load blocks 30, 32, which apply to the clutch discs hydraulic force developed on the piston and react that force. When the clutch is engaged, a snap ring 34, fixed to the inner surface of cylinder 18, limits the axial extent of displacement of the clutch disc sets and load blocks.

An hydraulic piston 36, located within cylinder 18, carries a dynamic hydraulic seal 38 for preventing the passage of hydraulic fluid admitted to cylinder 18. A seal 40, carried on hub 14, continually contacts an axial surface of piston 36 to prevent the passage of hydraulic fluid therepast. Axial displacement of piston 36 in the left-hand direction is limited by contact between a projection 42 on the face of piston 36 and an adjacent surface formed on the inner surface of hydraulic cylinder 18. Displacement of piston 36 in the right-hand direction is limited by contact of load block 30 on snap ring 34.

A balance piston 46 carries a seal 48 contacting the inner surface of piston 36 and defines an annular space about axis 16 within which a spring pack assembly 50 is located. Balance piston 46 defines a radially directed flange 52 located adjacent a snap ring groove 54 formed on the outer surface of hub 14.

The spring pack assembly 50 includes approximately 36 compression springs 56 spaced mutually angularly about axis 16. The right-hand end of each spring is engaged in a spring supporter ring 56; the left-hand end of each spring bears against a spring support, forced by the spring into contact with piston 36.

Pressurized hydraulic fluid is directed through passage 58 between piston 36 and cylinder 18, thereby developing on the face of piston 36 an axially directed pressure force tending to move the piston rightward into contact with pressure plate 32. This action takes up the clearances between clutch discs 26, 28 and clearance between pressure plates 30, 32 and snap ring 34. When cylinder 18 is vented, piston 36 is forced leftward into contact with the inner wall of the cylinder due to the force applied to the piston by the compression springs 56 of the spring pack assembly 50.

The direct clutch 10 includes structurally similar and functionally identical components to those of clutch 12. Clutch 10 includes hydraulic cylinder 60, and piston 62, movable within the cylinder leftward due to a pressure force developed on the piston by hydraulic fluid directed to the cylinder through passage 64. Piston 62 moves rightward due to the effect of force applied to the piston by a spring assembly 66. A first set 68 of clutch discs is splined to the inner surface of cylinder 60, and a second set of clutch discs 70 is splined to a component that is drivably connected through clutch 10 to the clutch hub. Cylinder 60 is connected to cylinder 18 at weld 72, thereby fixing cylinder 60 against axial displacement relative to hub 14.

The subassembly of the clutches 10, 12 and hub 14 is completed by inserting a snap ring (not shown but similar to snap ring 34) in the snap ring groove 54 such that the compression preload developed in the springs 56 is at a predetermined magnitude. In order to accomplish this result, the thickness of the snap ring, i.e., its axial dimension, is determined by the device located at the left-hand side of the drawing.

A load apply ring 74 is located at a position near the outer surface of balance piston 46 and is connected to that surface by a spacer or multiple spacers 76 disposed at angular positions about the central axis 16. The axial position of the surface of ring 74 from balance piston 46 is determined by the ring thickness and spacer depth. Ring 74 carries several guide bushings 78; preferably three bushings are mutually spaced angularly at equal intervals about the central axis. Located within each guide bushing is a length gauge 80 having, at its end closest to balance piston 46, a tang 82, which extends within the snap ring groove 54. Located at the opposite axial end of gauge 80 from the location of tang 82 is a compression spring 84, which contacts the adjacent surface of guide bushing 78 and a button 86 carried on the end of gauge L. Springs 84 hold tangs 82 in contact with the edge of groove 54 that is closest to ring 74. Dimension D is recorded.

An axially directed force is applied to the center of plate 74, preferably through an hydraulic piston, the magnitude of the force monitored by a load cell 90.

Dimension X, the distance between the right-hand end surface of balance piston 46 and the surface of ring 74 that is opposite the balance piston, is established by the thickness of ring 74 and axial dimension of spacers 76.

When the load cell indicates a force of about 400 pounds is applied to ring 74, the displacement of reference surface 92 due to this force, i.e., the change in dimension D, is determined. This change in dimension D is substantially the thickness of the snap ring to be fitted within groove 54 so that it produces a spring preload of a predetermined magnitude. The snap ring thickness has a dimension of $0.060 \pm 0.002$ inches. Preferably, at least three snap ring thicknesses within this thickness range are available so that the closest of these thicknesses to the OD dimension will be installed in the snap ring groove. The spring constant of the spring pack is approximately 1400 lbs/in. The change of dimension D due to the load on ring 74 is about 3 mm.

The technique of this invention can be applied successfully to a spring assembly comprising Belleville springs in place of the helically coiled compression spring shown in the FIGURE. With suitable modifications, the invention can be applied equally well to an assembly of tension springs rather than compression springs.

Having described a preferred embodiment of our invention, what we claim and desire to secure by U.S. Letters Patent is:

1. A method for assembling an automatic transmission friction element, comprising the steps of:
   forming a groove on a hub of the friction element;
   fixing against displacement an hydraulic cylinder on the hub;
   installing within the cylinder and surrounding the hub a piston, balance piston, and spring pack, such that the piston and balance piston are spaced mutually along the hub, the piston contacts the cylinder, the spring pack is located between the piston and balance piston, and the balance piston is located near the groove;
   displacing the spring pack by applying a force of predetermined magnitude to the balance piston;
   determining the displacement of the spring pack due to the force;
   removing the force; and
   installing in the groove adjacent the balance piston a snap ring having a thickness substantially equal to said displacement such that the snap ring maintains a load in the spring pack.

2. The method of claim 1 further comprising locating the friction element in an automatic transmission.

3. The method of claim 1 wherein the spring pack comprises compression springs, the force is directed substantially parallel to the length of the hub, and the snap ring maintains a compression load in the springs.

4. The method of claim 1 wherein the spring pack comprises coiled compression springs, the force and displacement are mutually parallel and are directed substantially parallel to the length of the hub, and the snap ring maintains a compression load in the springs.

5. The method of claim 1 wherein the spring pack comprises Belleville compression springs, the force is directed substantially parallel to the length of the hub, and the snap ring maintains a compression load in the springs.

6. A method for assembling an automatic transmission friction element, comprising the steps of:
 forming a groove on a hub of the friction element;
 fixing against displacement an hydraulic cylinder on the hub;
 installing within the cylinder and surrounding the hub a piston, balance piston, and spring pack, such that the piston and balance piston are spaced mutually along the hub, the piston contacts the cylinder, the spring pack is located between the piston and balance piston, and the balance piston is located near the groove;
 locating a ring in contact with the balance piston;
 maintaining a length gauge in contact with an axial surface of the groove, the gauge defining the position of a reference surface with respect to said surface of the groove;
 applying a load of predetermined magnitude through the ring to the balance piston;
 determining the displacement of the reference surface due to the load;
 removing the force; and
 installing in the groove adjacent the balance piston a snap ring having a thickness substantially equal to said displacement such that the snap ring maintains a load in the springs.

7. The method of claim 6 further comprising locating the friction element in an automatic transmission.

8. The method of claim 6 wherein the spring pack comprises compression springs, the force is directed substantially parallel to the length of the hub, and the snap ring maintains a compression load in the springs.

9. The method of claim 6 wherein the spring pack comprises coiled compression springs, the force and displacement are mutually parallel and are directed substantially parallel to the length of the hub, and the snap ring maintains a compression load in the springs.

10. The method of claim 6 wherein the spring pack comprises Belleville compression springs, the force is directed substantially parallel to the length of the hub, and the snap ring maintains a compression load in the springs.

* * * * *